(No Model.)

E. J. WOOD.
METER FOR STEAM.

No. 418,329. Patented Dec. 31, 1889.

Witnesses:
Joseph W. Roe.
C. E. Sundgren.

Inventor:
Edgar J. Wood
by attorneys
Brown & Hall

UNITED STATES PATENT OFFICE.

EDGAR J. WOOD, OF BROOKLYN, NEW YORK.

METER FOR STEAM.

SPECIFICATION forming part of Letters Patent No. 418,329, dated December 31, 1889.

Application filed March 22, 1888. Serial No. 268,062. (No model.)

*To all whom it may concern:*

Be it known that I, EDGAR J. WOOD, a citizen of the United States, residing at the city of Brooklyn, county of Kings, and State of New York, have invented a new and useful Improvement in Meters for Steam and other Aeriform Bodies, of which the following is a specification, reference being had to the accompanying drawings.

This invention is more especially intended for the measurement of steam to be supplied by producers on a large scale to consumers on a small scale for motive power or heating purposes; but it may be used for the measurement of other aeriform fluids.

A meter constructed according to my invention has two cylinders or measuring-chambers arranged by side containing pistons or floats and provided at or near their bottoms with free communication for the passage back and forth from each to the other of water or other liquid, and having at their upper ends passages and ports for communication with the pipe from the generator or source of supply and with the pipe leading to the place of consumption. Valves operated by the pistons or floats are provided for opening and closing the said ports or passages in such manner that while the steam or fluid to be measured is entering either cylinder or chamber at the top and filling it that which has been already measured in the other cylinder or chamber is forced out therefrom by the rise therein of the water or liquid, which is forced thereinto at the bottom from the one which is being filled with the steam or fluid to be measured. Dial-work, like that of an ordinary gas-meter, is operated by the piston, float, or valve gear to register the number of fillings and discharges of the cylinders or measuring-chambers, and thus to register the volume of steam passing through the latter. On the inlet or outlet duct I generally apply a steam-gage, preferably a recording-gage, to show or record the pressure at which the measuring is performed. The upper parts of the cylinders or measuring-chambers may communicate with a steam-trap, by which any water of condensation accumulating above the pistons or floats may be allowed to escape, so that the consumer may be supplied with steam as nearly dry as practicable and the temperature and pressure of which have been accurately measured.

My invention consists in the novel combinations of parts hereinafter specified and claimed in a meter of the character hereinabove generally described.

Figure 1:
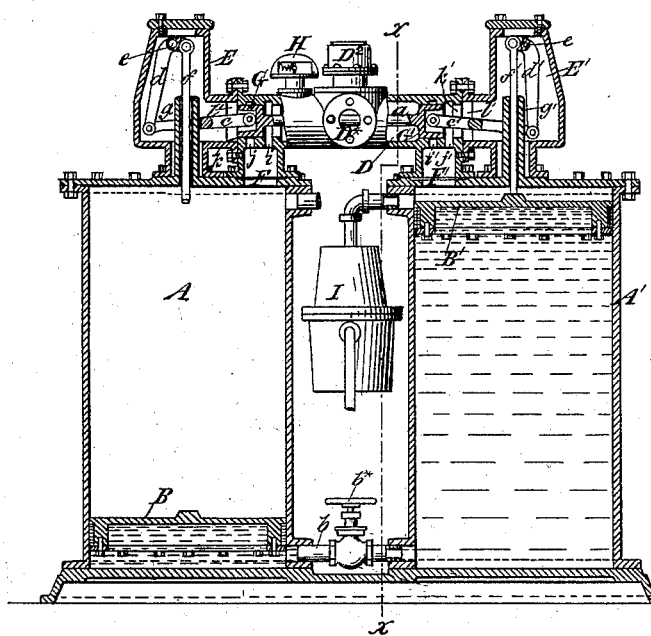
Figure 2:
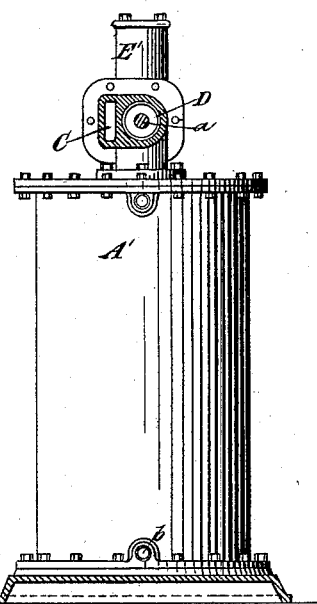
Figure 3:
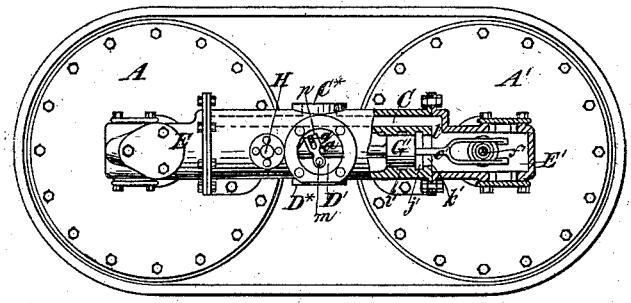

Figure 1 represents a vertical sectional view taken through the two cylinders or measuring-chambers of a meter constructed according to my invention. Fig. 2 represents a vertical section at right angles to Fig. 1, taken between the two cylinders in the line $x$. Fig. 3 is a plan of the same with part of the inlet and outlet passages and ports in section.

Similar letters of reference indicate corresponding parts in the several figures.

A A' designate two closed upright cylinders constituting the measuring-chambers, arranged side by side and intercommunicating at their lower parts by a pipe $b$, in which is placed a hand-valve $b^*$, for the purpose of adjusting the said intercommunication to make it more or less free.

B B' are the pistons or floats—one in each cylinder. These should preferably have an easy and close piston-like fit to the cylinders. Below the two cylinders is a volume of water or other liquid sufficient to fill the space left in either cylinder below the piston when the latter is at the top and to keep at the same time a small quantity in the other cylinder.

C D E E' designate a valve-chest arranged above the two cylinders A A' and connected therewith by two short pipes or ducts F F'. In this valve-chest there are two straight passages C D, arranged side by side, and two boxes E E'—one at each end—both of the said passages C D and both of said boxes having communications, as hereinafter described, with the two cylinders. The passage C, which is the induction-passage, has connected with it at its opening C* the pipe from the steam-generator or source of the supply, and the eduction-passage D has connected with it at D* the pipe leading to the place of consumption.

The eduction-passage D has bored in it two cylindrical seats for the piston-valves G G', which are both fast to the same stem $a$. The said valves are also connected by rods $c\ c'$ with two levers $d\ d'$, each of which is arranged in one of the boxes E E' on a fixed fulcrum $e$. The said levers have also suspended from them rods $f\ f'$, which project downward into the cylinders A A through stuffing-boxes or steam-tight guides $g\ g'$ in the heads of the said cylinder. In the cylindrical seat of the valve G there are two ports $i\ j$, both communicating with the cylinder-duct F of the cylinder A, and in the cylindrical seat of the valve G' there are two similar ports $i'\ j'$, both communicating with the port F' of the cylinder A'. The outer ends of the valve-seats have openings $k\ k'$ to the boxes E E', and the inlet-passage C has openings $l\ l'$ to the said boxes.

Over an opening D' in the top of the passage D there is placed a box $D^2$, (see Fig. 1,) containing dial-work, which resembles that of an ordinary gas-meter, and which is set in motion by an upright oscillating shaft $m$, (see Fig. 2,) which derives motion from the valve-stem $a$ through a pin $q$, secured to said stem and entering a slot in a small lever $p$, secured to the said shaft $m$. On the passage D there is also represented a recording pressure-gage H.

The cylinder A' has (shown in Fig. 1) a steam-trap I connected with it at a point on a level with the highest point reached by its piston in order to provide for the escape of any water of condensation remaining in the said cylinder above its piston when the latter completes its upward stroke. A similar trap may be applied in a similar manner to each cylinder.

The steam or aeriform fluid to be measured is admitted from the passage C to each of the cylinders in turn through the port $j$ or $j'$ and duct F or F' at its upper end. At the same time the steam which has filled the other cylinder is allowed to pass out therefrom through its port $i'$ or $i$ and duct F' or F to the passage D, such admission and escape being controlled by the valves G G', which are shifted by one of the pistons striking and pushing up the rod $f$ or $f'$ at the end of its upward movement produced by the water or liquid being driven into its cylinder from the other cylinder through the pipe $d$ as the piston of the latter cylinder descends. To illustrate this operation, I will suppose the left-hand cylinder A, Fig. 1, to have been just filled with steam, which has forced its piston down to or nearly to the bottom and caused it to drive out the liquid into the right-hand cylinder A', whose piston has thus been raised high enough to lift the rod $f'$, and so to cause the latter, through its lever $g'$, to move the valves to the left. The aperture $k'$ in the outer end of the seat of the right-hand valve G' and the induction-port in said seat are now open and the eduction-port $i'$ in the said seat is closed, (see Figs. 1 and 3,) while the aperture $k$ in the outer end of the seat of the left-hand valve G and the induction-port $j$ in the said seat are closed and the eduction-port $i$ in the said seat is open. (See Fig. 1.) The steam is now free to enter the right-hand cylinder A' from the inlet-passage C and to leave the left-hand cylinder A through the passage D. The filling of the cylinder A' with steam will now commence, and the downward movement of its piston B' will force the water from the said cylinder through the pipe $b$ into the cylinder A, whose piston will thereby be caused to rise till it strikes and pushes up the rod $f$, and so through the lever $d$ moves the valves to the right to close the port $j'$ and aperture $k'$ and open the port $i'$ of the right-hand valve-seat, and at the same time open the aperture $k$ and port $j$ and close the port $i$ of the left-hand valve-seat after which the cylinder A will again be filled and A' discharged. The strokes of the valve-stem being registered by the dial-work in the box D, the said dial-work indicates the volume of steam passing through the cylinders, while the gage will show the pressure, so that, the volume and pressure being calculated, the quantity of steam supplied may be accurately ascertained.

The valve $b^*$ in the pipe $b$ serves to adjust the liquid communication between the two cylinders in such manner as to produce a steady operation of the meter.

What I claim as my invention, and desire to secure by Letters Patent, is—

1. The combination, with the two cylinders or measuring-chambers having constant communication between them for liquid contained in the lower parts thereof, the pistons or floats contained in said cylinders, and the valve-chest and valves for the induction and eduction of the steam or fluid to be measured to one and the other of the said cylinders alternately at the upper ends thereof, of a hand-valve for adjusting the communication for the liquid between the lower parts thereof, substantially as herein described.

2. The combination, with the two upright measuring-cylinders A A', arranged side by side, and pistons or floats therein, of a valve-chest common to both cylinders, arranged at the upper ends thereof and containing induction and eduction passages C D, arranged side by side, and boxes E E'—one at each end of said passages—the said induction-passage C having a constant communication with the inlet-pipe, and the said eduction-passage D containing two cylindrical valve-seats, one containing ports $i\ j$, communicating with one cylinder, and the other containing ports $i'\ j'$, communicating with the other cylinder, piston-valves G G'—one for each cylinder—connected together in line with each other within said seats, levers $d\ d'$, inclosed within said boxes E E', connections $c\ c'$ between said levers and valves, and rods $f\ f'$, applied to said levers and entering the two cylinders to be acted upon by the pistons or floats therein, substantially as and for the purpose herein set forth.

EDGAR J. WOOD.

Witnesses:
FREDK. HAYNES.
JOS. W. ROE.